Patented Aug. 15, 1933

1,922,481

UNITED STATES PATENT OFFICE 1,922,481

PRODUCTION OF HALOGEN DERIVATIVES OF DIBENZOPYRENE QUINONES

Max Albert Kunz, Mannheim, and Karl Koeberle and Erich Berthold, Ludwigshafen-on-the-Rhine, Germany, assignors to General Aniline Works, Inc., New York, N. Y., a Corporation of Delaware No Drawing. Application January 4, 1930, Serial No. 418,647, and in Germany January 12, 1929

8 Claims. (Cl. 260—61)

The present invention relates to the production of halogen derivatives of 3.4.8.9-dibenzopyrene-5.10-quinones.

It has already been proposed to produce halogen derivatives of 3.4.8.9-dibenzopyrene-5.10-quinones by the action of halogen or halogenating agents in sulphric acid or derivatives thereof in the presence of halogenating catalysts. The products obtained according to the said process dye cotton more reddish shades in the case of bromo derivatives and more greenish shades in the case of chloro derivatives than the unhalogenated initial material, the said halogen derivatives having at least twice the coloring power of the initial material.

We have now found that halogen derivatives of about equal good coloring power the shades obtained therewith being, however, always more reddish than those of the initial material are produced by treating 3.4.8.9-dibenzopyrene-5.10-quinone or its derivatives with halogen or halogenating agents in the absence of inorganic dissolving media, or in organic dissolving or suspending media, and in the presence of halogenating catalysts. As organic diluting media those usually employed in halogenation processes may be used, in particular benzenes and naphthalenes containing negative substituents such as nitro groups or halogens. The known halogenating catalysts may be employed in the process, such as metals and their compounds or metalloids, for example sulphur, phosphorus and in particular iodine, several halogenating catalysts may be used simultaneously. The halogenation may be carried out with the halogens themselves or with halogenating agents, such as the various compounds of halogens with each other, for example chloroiodine, the pentahalogen compounds of phosphorus, or sulphuryl chloride which is a particularly good reagent for chlorinating dibenzopy renequinone in organic solvents.

The process according to the present invention is a valuable improvement of the process of halogenating 3.4.8.9-dibenzopyrene-5.10-quinones in sulphuric acid in the presence of halogenating catalysts by which uniform dibromo derivatives of strong tinctorial power are readily obtained, in that the present process provides for a method by which uniform monobromo derivatives of about equal strong tinctorial power are readily produced, the shades obtained therewith being more reddish than those obtained from the unhalogenated initial material, higher brominated being obtained only under strong conditions, for example by bromination under pressure. By the chlorination according to the present invention, however, uniform mono- and dichloro derivatives are obtained according to the amount of chlorinating agent employed which in the case of monochloro derivatives should not substantially exceed the calculated quantity, the chloro derivatives dyeing always more reddish shades than the initial material free from halogen and are of decidedly stronger coloring power.

The uniform halogen-3.4.8.9-dibenzopyrene-5.10-quinones obtainable according to our invention in good yields and usually in a very pure form, dissolve in concentrated sulphuric acid generally speaking giving a violet colouration; the colour of their vats is bluish red and they dye cotton from the vat usually from orange to reddish orange shades. If necessary they may be purified by the usual methods as for example by crystallization from organic solvents or sulphuric acid, by vatting, by sublimation, or by treatment with oxidizing agents as for example by treatment with alkali metal or alkaline earth metal hypochlorites. The leuco preparations, as for example the leuco esters, may be obtained from the halogendibenzo-pyrene-quinones in the usual manner.

The following examples will further illustrate the nature of this invention but this invention is not restricted to these examples. The parts are by weight.

Example 1

33.2 parts of 3.4.8.9-dibenzopyrene-5.10-quinone are suspended in 300 parts of nitrobenzene and after the addition of 3 parts of iodine and 3 parts of iron, 30 parts of bromine are added at 160° centigrade and the whole is stirred for several hours at from 160° to 170° centigrade. As soon as all the bromine has been used up the whole is allowed to cool and the reaction product, a monobromo-3.4.8.9-dibenzopyrene-5.10-quinone, is isolated by filtration by suction or by distillation, if desired with steam or under reduced pressure or both. The product is a crystalline orange coloured powder which dissolves in concentrated sulphuric acid giving a violet colouration and which gives powerful, clear, reddish golden yellow dyeings of very good fastness on the vegetable fibre from a blue red vat. The product also constitutes a valuable intermediate product for the manufacture of new dyestuffs by reason of its uniformity and its reactivity.

A uniform monobromo derivative is also obtained in an analogous manner from 1 part of crude dibenzopyrene-quinone, suspended in 10 parts of nitrobenzene, with 1 part of bromine at 170° centigrade with the addition of a little iodine.

Example 2

100 parts of 3.4.8.9-dibenzopyrene-5.10-quinone are ground in a ball mill at from 30° to 40° centigrade with 200 parts of bromine after the addition of 3 parts of iodine until a sample taken out has the necessary content of bromine, which is the case after several hours. The excess of bromine is recovered by filtration or distillation, the reaction mixture is diluted with water to which a little caustic soda has been added and is filtered by suction. The reaction product corresponds with that obtained in Example 1 as regards its properties.

Monochloro-3.4.8.9-dibenzopyrene-5.10 - quinone is obtained by passing chlorine gas over finely divided 3.4.8.9 - dibenzopyrene-5.10 - quinone to which a little sulphur has been added.

Example 3

66 parts of pure 3.4.8.9-dibenzopyrene-5.10-quinone are heated for six hours at between 180° and 200° centigrade in 1500 parts of nitrobenzene with 170 parts of iodomonochloride. After cooling, the monochloro-3.4.8.9-dibenzopyrene-5.10-quinone is filtered off and freed from nitrobenzene by distillation with steam. It dissolves in concentrated sulphuric acid to give a violet colouration and dyes cotton from the vat orange yellow shades substantially more reddish than the golden yellow shades produced by the initial material, the shades being fast to washing and light.

Example 4

33.2 parts of pure 3.4.8.9-dibenzopyrene-5.10-quinone obtainable by crystallization or sublimation of the crude dibenzopyrenequinone are suspended in 300 parts of nitrobenzene and heated to between 90° and 100° centigrade while stirring after the addition of 3 parts of iodine. 45 parts of sulphuryl chloride are allowed to run in at the same temperature which is maintained for several hours and then raised for about between one and two hours to between 150° and 170° centigrade, whereupon the reaction mixture is worked up in the usual manner. The reaction product, a dichloro-3.4.8.9-dibenzopyrene-5.10-quinone is an orange powder crystallizing from nitro-benzene or other organic solvents of high boiling point in orange red needles as fine as hair, dissolves in concentrated sulphuric acid to give violet solutions and dyes vegetable fibres from a blue red vat strong brillant golden orange shades of very good fastness.

The chlorination may also be carried out in dichlorobenezene or other organic solvents by means of chlorine. Other halogenating catalysts for example iron chloride or sulphur or several halogenating catalysts may be employed instead of or besides iodine. When employing mono-bromo-3.4.8.9-dibenzopyrene-5.10-quinone instead of the unhalogenated initial material a chloro-bromo derivative is obtained in the aforedescribed manner which dyes slightly more yellowish golden orange shades.

Mono-methoxy-3.4.8.9-dibenzopyrene-5.10-quinone obtainable by methylation of mono-hydroxy-dibenzopyrene-quinone yields an orange dyeing chloro-methoxy derivative in the aforedescribed manner.

What we claims is:—

1. A process of producing halogen-3.4.8.9-dibenzopyrene - 5.10 - quinones which comprises treating a 3.4.8.9-dibenzopyrene-5.10-quinone in the absence of inorganic diluting media with a halogenating agent in the presence of a halogenating catalyst.

2. A process of producing halogen-3.4.8.9-dibenzopyrene - 5.10 - quinones which comprises treating a 3.4.8.9-dibenzopyrene-5.10-quinone in an organic diluting medium with a halogenating agent in the presence of a halogenating catalyst.

3. A process of producing halogen-3.4.8.9-dibenzopyrene - 5.10 - quinones which comprises treating a 3.4.8.9- dibenzopyrene-5.10-quinone in an organic diluting medium with a halogenating agent in the presence of iodine.

4. A process of producing chloro-3.4.8.9-dibenzopyrene - 5.10 - quinones which comprises treating a 3.4.8.9-dibenzopyrene-5.10-quinone in an organic diluting medium with sulphuryl chloride in the presence of iodine.

5. As new compounds, 3.4.8.9-dibenzopyrene-5.10-quinones containing at least one atom of halogen dissolving in concentrated sulphuric acid to give violet solutions crystallizing in orange needles from high boiling organic solvents and dyeing cotton strong yellow orange shades from bluish red vats, the colouring power of said products being substantially higher than that of 3.4.8.9-dibenzopyrene-5.10-quinone.

6. As a new compound, uniform mono-bromo-3.4.8.9-dibenzopyrene-5.10-quinones dissolving in concentrated sulphuric acid to give a violet solution crystallizing from high boiling organic solvents in orange needles and dyeing cotton strong yellow orange shades from a bluish red vat, the colouring power of said product being substantially higher than that of 3.4.8.9-dibenzopyrene-5.10-quinone.

7. As new compounds, uniform 3.4.8.9-dibenzopyrene-5.10-quinones containing two atoms of halogen dissolving in concentrated sulphuric acid to give violet solutions crystallizing from high boiling organic solvents in orange needles and dyeing cotton strong golden orange shades from reddish violet vats, the colouring power of said products being substantially higher than that of 3.4.8.9-dibenzopyrene-5.10-quinone.

8. As a new compound, uniform dichloro-3.4.8.9-dibenzopyrene-5.10-quinones dissolving in concentrated sulphuric acid to give a violet solution crystallizing from high boiling organic solvents in orange red needles and dyeing cotton strong golden orange shades from a reddish violet vat, the colouring power of said product being substantially higher than that of 3.4.8.9-dibenzopyrene-5.10-quinone.

MAX ALBERT KUNZ.
KARL KOEBERLE.
ERICH BERTHOLD.